July 24, 1956    W. A. RINGLER    2,755,965
COLLAPSIBLE BOTTLE CARRIERS
Filed July 22, 1952    6 Sheets-Sheet 1

INVENTOR.
WILLIAM A. RINGLER
BY
Reuben T. Carlson
ATTORNEY.

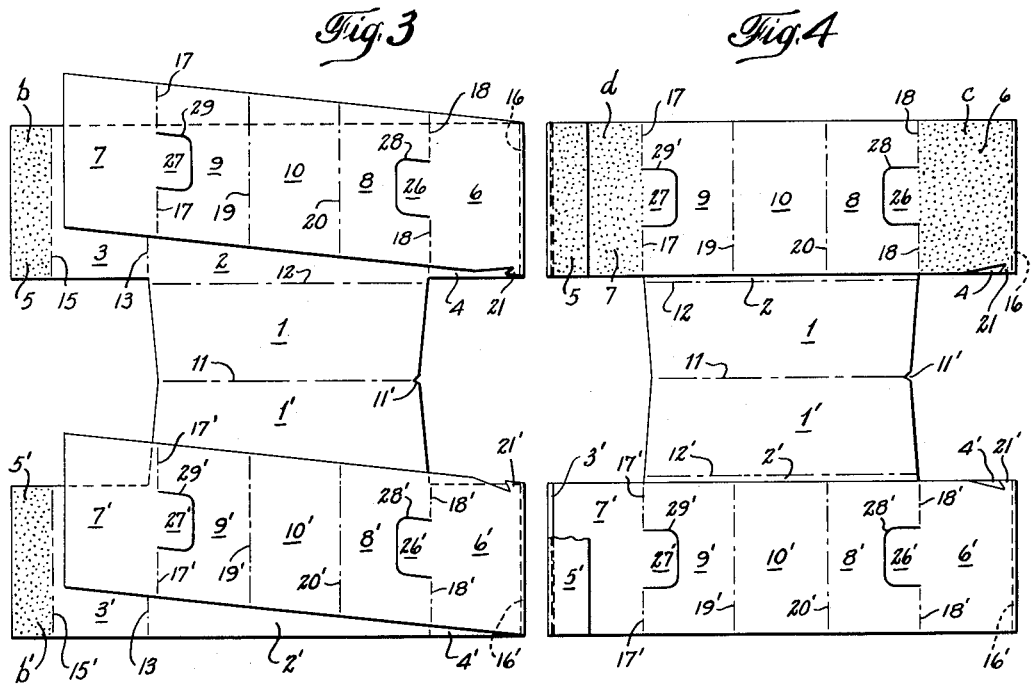

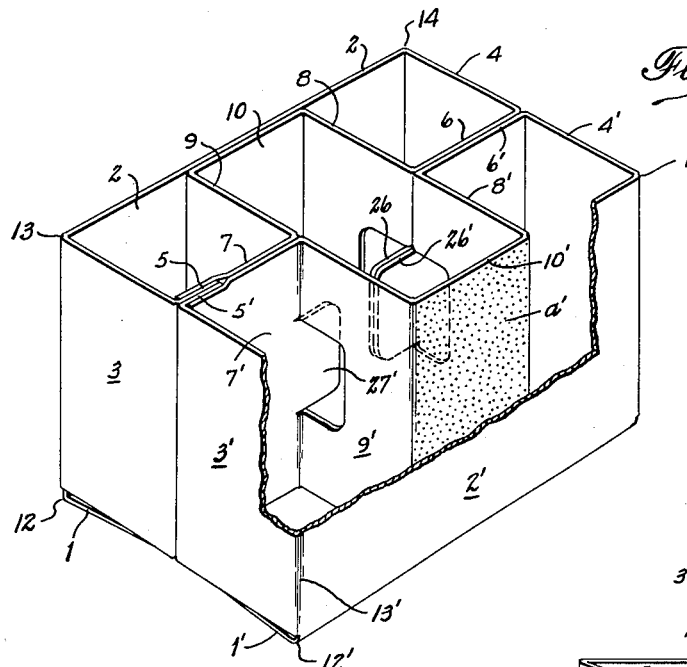
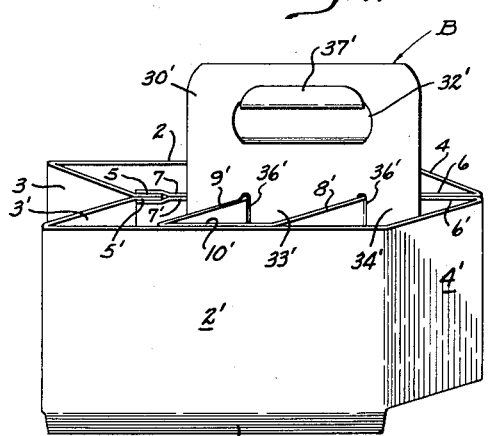
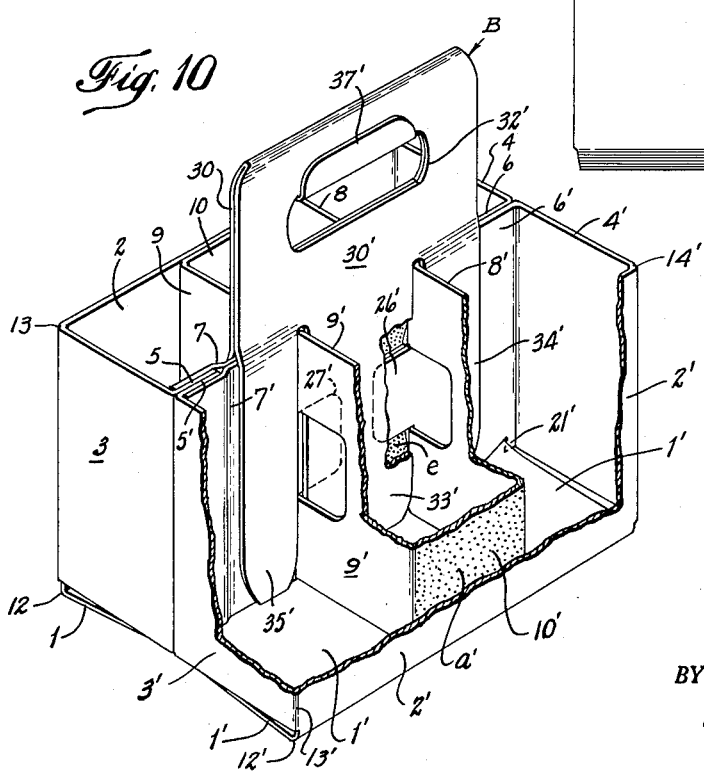

July 24, 1956 W. A. RINGLER 2,755,965
COLLAPSIBLE BOTTLE CARRIERS
Filed July 22, 1952 6 Sheets-Sheet 5
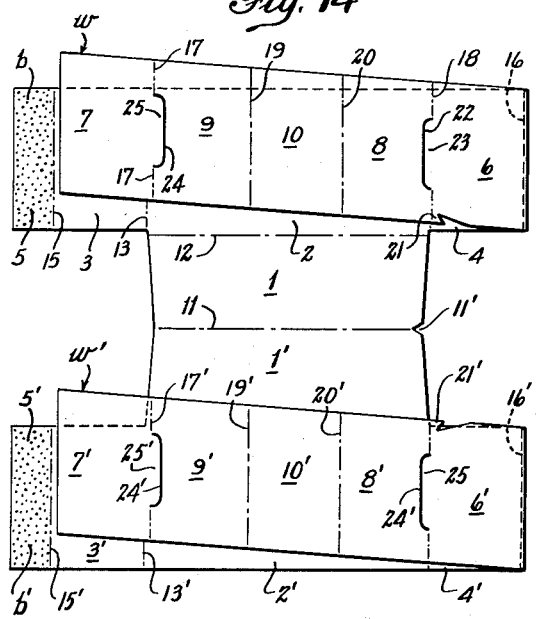
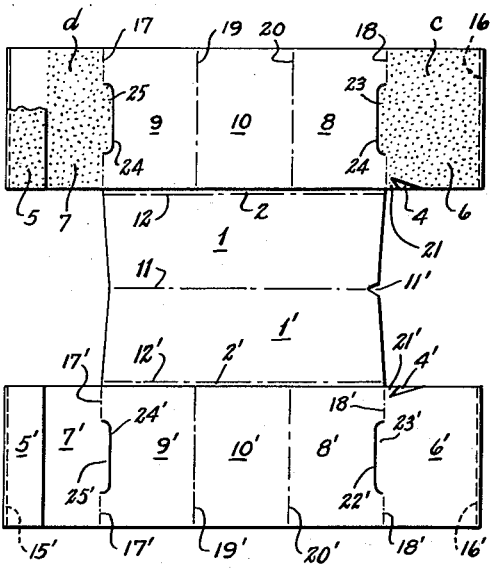
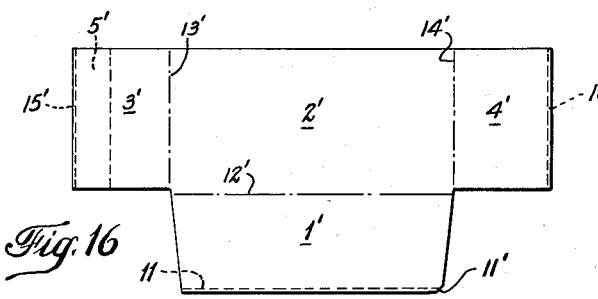
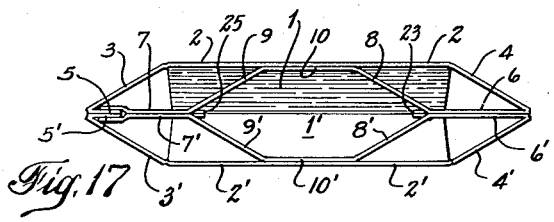
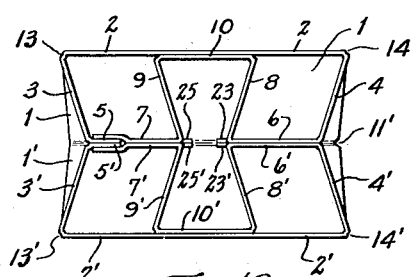
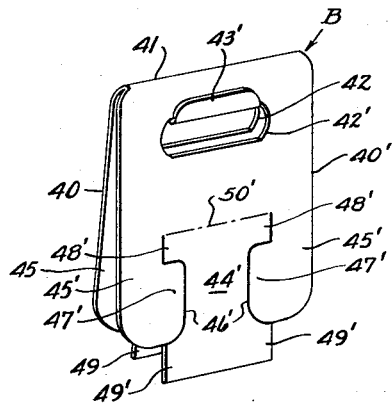
INVENTOR.
WILLIAM A. RINGLER
BY
Reuben J. Carlson
ATTORNEY.

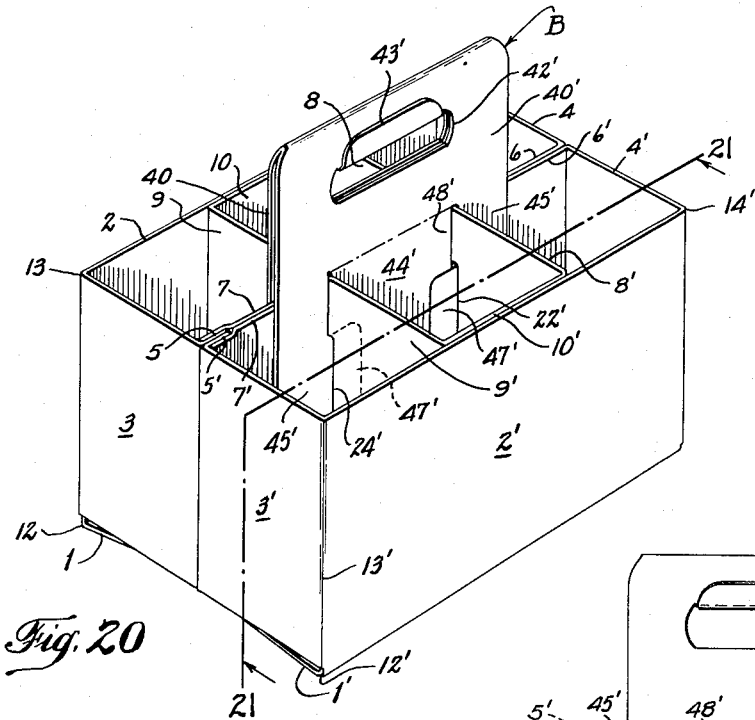

United States Patent Office 2,755,965
Patented July 24, 1956

2,755,965

COLLAPSIBLE BOTTLE CARRIERS

William A. Ringler, Wayne, Pa., assignor to The Gardner Board & Carton Co., Middletown, Ohio, a corporation of Ohio Application July 22, 1952, Serial No. 300,206

2 Claims. (Cl. 220—118)

This invention relates to collapsible bottle carriers, and more particularly to twin compartmented multi-celled bottle carriers formed from paperboard or fiberboard material which are designed to permit flat collapse thereof during shipment and storage and convenient erection for bottle filling and transportation.

Consumer demand for bottled soft drinks and other beverages has made it desirable and necessary for the beverage bottling and distributing industry to provide bottle carriers by means of which the consumer may conveniently receive and transport a plurality of beverage filled bottles and conveniently return the empty bottles. Beverage bottlers and distributors have also found it increasingly desirable to install systematized equipment for filling the carriers, placing the filled carriers in low walled distributing cases, stacking and transporting the carrier filler distributing cases, and removing the empty bottles from the returned carriers for washing and cleansing. To meet these manifold requirements, bottle carriers accordingly must be strong and sturdy in construction to permit repeated use thereof, attractive and appealing in appearance, and designed to permit convenient erection, bottle filling and stacking, and convenient collapse thereof for shipment and storage.

Bottle carriers made in accordance with this invention are each formed from a carrier body forming blank and a companion handle forming blank captured from otherwise waste material removed from between the wing extensions of the body blank. The paperboard or fiberboard stock sheets from which the paired body and handle blanks are cut, need be finished and imprinted on one side thereof only, and the paired blanks are designed to permit simultaneous scoring and cutting thereof from the same stock sheet in a single pass through a cutting and scoring machine with little waste of stock sheet material.

These carrier body forming blanks are scored and cut in a manner to permit high speed gluing and folding thereof in a minimum number of operations and in a single pass through a gluing and folding machine of substantial standard construction, to provide a twin compartmented carrier body assembled in collapsed form. The companion handle blank, recovered from removed material between the wing extensions of the body blank, is designed to provide two hingedly connected handle sections adapted for convenient securement to the end cell center partition sections of the carrier body to provide a carrier having a multi-ply center partition and a strong and sturdy handle part of multi-ply construction.

These assembled carriers present side wall panels which are foldably connected to a collapsible bottom panel and may be made of any desired height. The side and end wall panels and the handle part of the assembled carrier present flat surfaces of substantial area for the generous application of attractive advertising decoration, with the bottles therein adequately displayed. The composite multi-ply center partition is centrally spaced between the side panels to provide a strong and sturdy backbone structure of the carrier. The paired end panel sections are foldably connected to the vertical side edges of the adjacent side panels and the multi-ply center partition, with the cell forming cross partition sections extending between and foldably connected to the side panels and center partition. The paired end panel sections and cross partition sections may be made full height to extend down to the flattened bottom panel of the erected carrier to thereby provide bottle retaining cells which fully separate the individual bottles as nested in the carrier cells.

These carriers are designed and constructed to permit low cost fabrication and assembly thereof, are durable and lasting in use, attractive in appearance, convenient for consumer handling, rigid and sturdy when erected, provide cushioned protection and retainment of the bottles nested therein, and are constructed in a manner to permit convenient erection and collapse thereof. Carriers constructed in accordance with this invention may be designed to contain four, six, twelve or any desired number of bottles.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawings forming a part hereof, in which:

Fig. 3 is a perspective view of the body forming blank as the same would appear during execution of the first folding operation;

Fig. 4 is a plan view of the body blank as it would appear after the completion of the first and second folding operations thereon, this view also showing adhesive applied to additional areas thereof preparatory to execution of the third folding operation;

Fig. 5 is a plan view of the collapsed carrier body as it would appear after the third folding operation has been executed on the partly folded blank shown in Fig. 4;

Fig. 6 is a top plan view of the carrier body as it would appear when undergoing erection expansion;

Fig. 7 is a top plan view of the carrier body as it would appear when fully expanded;

Fig. 8 is a perspective view of the erected carrier body, certain parts being broken away to reveal structural details thereof;

Fig. 9 is a perspective view of the glued handle forming blank after it has been folded for application to the expanded carrier body;

Fig. 10 is a perspective view of the fully assembled bottle carrier with the handle part attached to the carrier body and set up to receive bottles in the cells thereof, certain parts being broken away to reveal structural details;

Fig. 11 is a perspective view of the fully assembled carrier showing the manner in which it may be collapsed into flat condition for shipment and storage;

Fig. 14 is a perspective view of the body forming blank shown in Fig. 13 as it would appear when undergoing the initial folding operation;

Fig. 15 is a plan view of the body forming blank as it would appear after the first and second folding operations have been executed, this view also showing additional areas of adhesive applied to further parts of the partially folded blank prior to execution of the third folding operation;

Fig. 16 is a plan view of the carrier body fully assembled in collapsed form as produced by the third folding operation executed upon the blank shown in Fig. 15;

Fig. 17 is a top plan view of the carrier body as it would appear when undergoing erection expansion preliminary to the application of the handle part thereto;

Fig. 18 is a top plan view of the carrier body as it would appear when shaped into a condition suitable for application of the handle part thereto;

Fig. 19 is a perspective view of the companion handle forming blank after the same has been glued and folded in condition for locking application to the carrier body when shaped as indicated in Fig. 18;

Fig. 20 is a perspective view of the fully assembled bottle carrier having the handle part locked to the carrier body thereof and set up to receive bottles;

Figure 1:
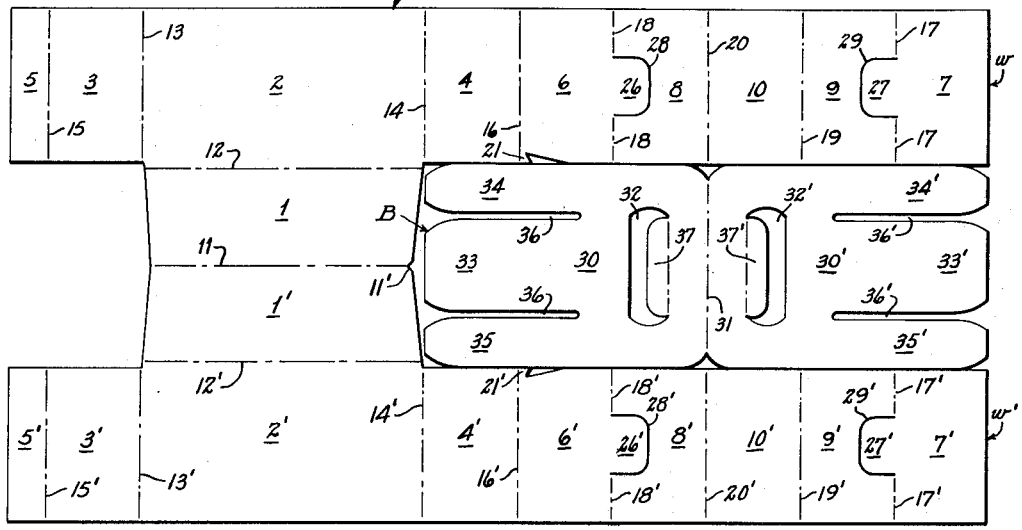
Fig. 1 is an inside face view of a six cell carrier body forming blank and a companion handle forming blank as they would appear when cut and scored from a paperboard or fiberboard stock sheet.

Fig. 21 is a vertical cross section taken longitudinally of the fully assembled carrier as viewed along line 21—21 of Fig. 20, this view further illustrating the manner in which the handle part is locked to the body part of the assembled carrier; and Fig. 22 is a perspective view of the fully assembled carrier illustrating the manner in which it may be collapsed into flat form for shipment and storage.

Similar reference characters refer to similar parts throughout the several views of the drawings and the specification.

Bottle carriers made in accordance with this invention are assembled from a carrier body forming blank A and a companion handle forming blank B which are so shaped and formed that a successive series of paired carrier body and handle blanks may be fully cut and scored from a stock sheet of selected paperboard or fiberboard in a single pass operation through an automatic cutting and scoring machine with very little waste resulting. The stock sheets from which the prepared blanks are cut may comprise virgin kraft stock or coated or lined wastepaper stock of suitable thickness and strength. The paired carrier forming blanks are so cut and scored that the stock sheet need be printed and decorated on one face thereof only, and when assembled as a finished carrier, the printing and decoration will all appear on the outside faces thereof.

Figure 2:
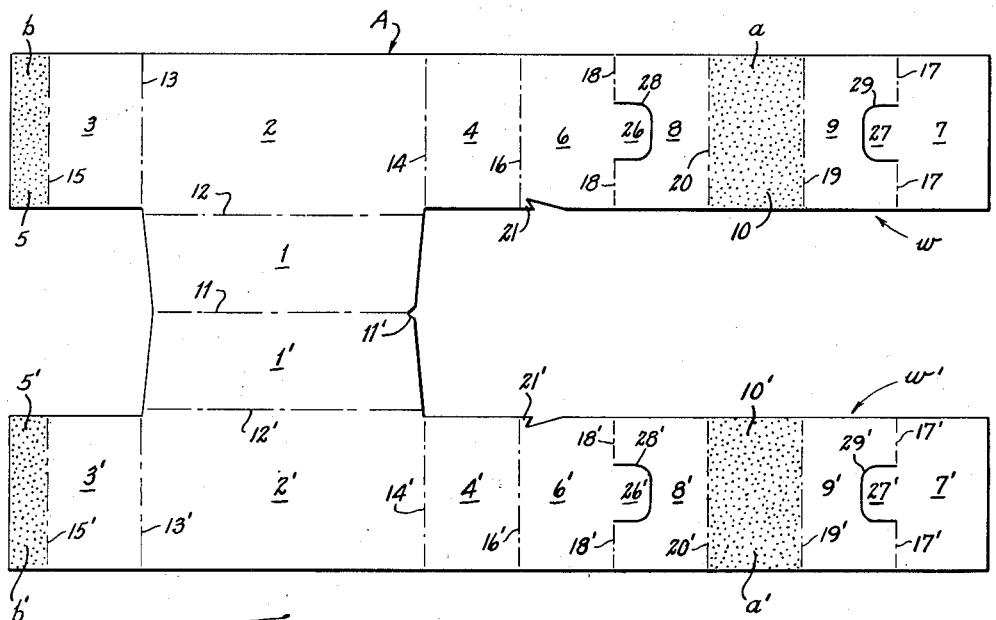
Fig. 2 is an inside face view of the carrier body forming blank showing areas of adhesive applied to certain parts thereof prior to the first folding operation.
Figure 13:
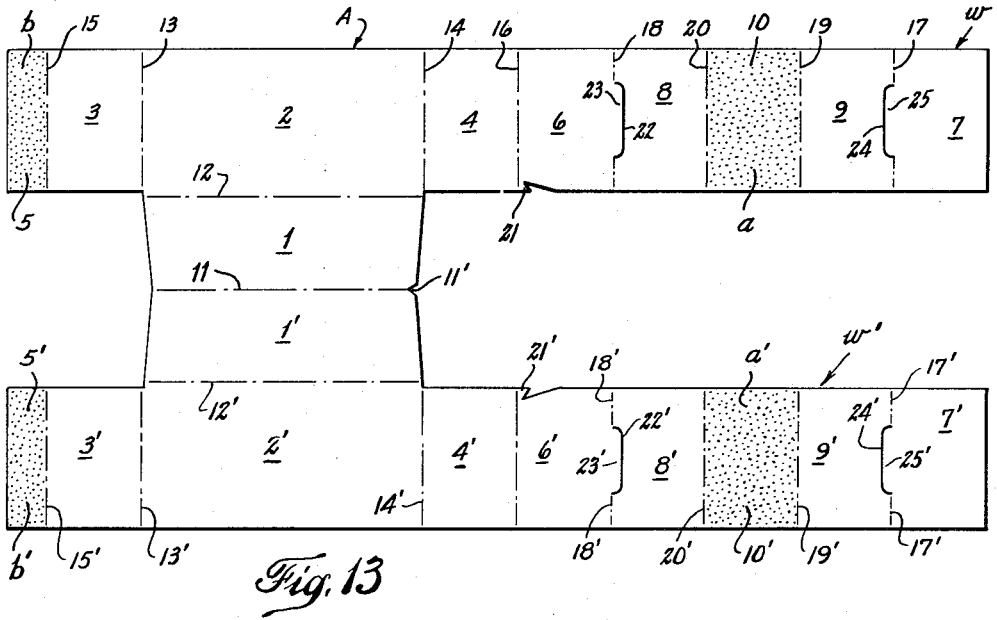
Fig. 13 is an inside face view of the body forming blank shown in Fig. 12, areas of adhesive being shown applied to certain parts thereof preparatory to executing the first folding operation.

The carrier body forming blanks shown in Figs. 2 and 13 are cut and scored to provide a bottom panel particularly designed for two rows of bottles with three bottles in each row. The bottom panel comprises bottom half sections 1 and 1' of similar size, hingedly connected along a longitudinally extending collapsing score 11. Side panels 2 and 2' are hingedly connected to the opposite side edges of the bottom sections 1 and 1' along parallel extending scores 12 and 12' which are also parallel to the bottom collapsing score 11. Wings w and w' extend from adjacent side edges of the side panels 2 and 2' to provide the material from which the cell forming walls are formed.

The wings w and w' as shown in Figs. 2 and 13, are scored to form a pair of end panel sections 4 and 4' foldably connected along score lines 14 and 14' to one of the adjacent side edges of the side panels 2 and 2' respectively. A pair of end cell center partition sections 6 and 6' are foldably connected along score lines 16 and 16' to the respective end panel sections 4 and 4'. Cross partition sections 8 and 8' are foldably connected along score lines 18 and 18' to the respective end cell center partition sections 6 and 6', and a pair of side wall liner sections 10 and 10' are foldably connected along score lines 20 and 20' to the respective cross partition sections 8 and 8'. Cross partition sections 9 and 9' are foldably connected along score lines 19 and 19' to the adjacent side wall liner sections 10 and 10', and end cell center partition sections 7 and 7' are foldably connected along score lines 17 and 17' to the adjacent cross partition sections 9 and 9'. The other pair of end panel sections 3 and 3' may also be incorporated into the wings w and w' of the blank to extend from the end cell center partition sections 7 and 7', but preferably the end panel sections 3 and 3' are made to extend from the opposite side edges of the side wall panels 2 and 2' to which they would be foldably connected along the aligned scores 13 and 13'. A pair of securing flaps 5 and 5' are foldably connected to the adjacent side edges of the end panel sections 3 and 3' along transverse score lines 15 and 15'.

The score lines 14, 16, 18, 20, 19 and 17 of wing extension w as shown in Figs. 2 and 13 are arranged in substantially parallel and equally spaced relationship and in substantial alignment with score lines 14', 16', 18', 20', 19' and 17' respectively of wing extension w'. As thus formed and defined, the end panel sections 4 and 4', the end cell center partition sections 6 and 6', the cross partition sections 8 and 8', the side wall liner sections 10 and 10', the cross partition sections 9 and 9' and the end cell center partitions 7 and 7' are of substantially uniform width, which width approximates the diameter of the bottles to be contained in the carrier body assembled therefrom. The score lines 13 and 15 are also substantially parallel to each other and to the opposite score line 14, with the score lines 13 and 15 substantially in alignment with the score lines 13' and 15' so as to define end panel sections 3 and 3' therebetween which have substantially the same width as the end panel sections 4 and 4'.

Figure 12:
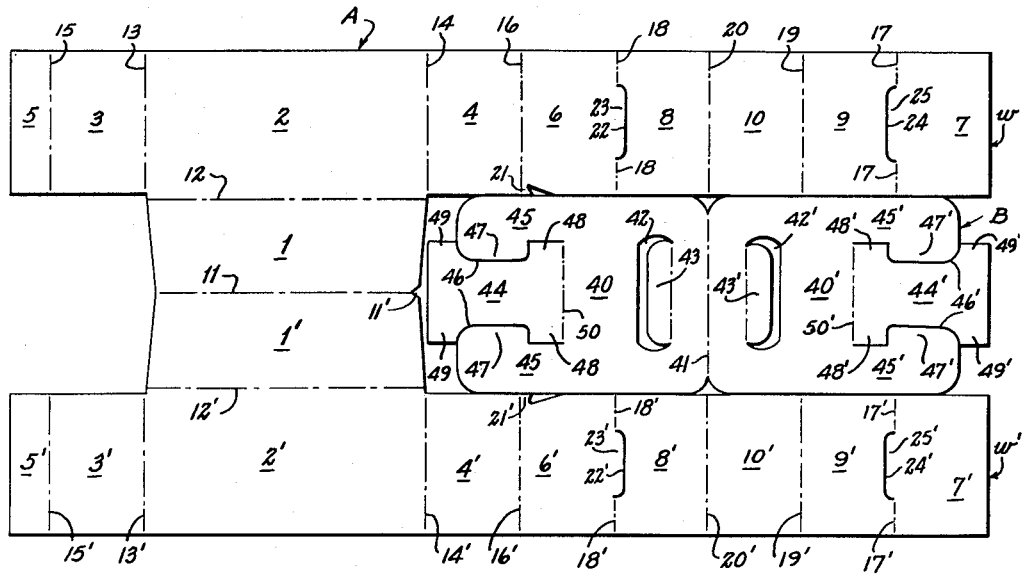
Fig. 12 is an inside face view of a modified carrier body forming blank and its companion handle forming blank as cut and scored from a paperboard or fiberboard stock sheet.

The handle forming blank B is captured from the sheet material between the wing extensions w and w' of the body blanks. Each handle forming blank B has a length which approximately corresponds to the length of the paired wings w and w' of its companion body blank as shown in Figs. 1 and 12. Each of these handle forming blanks is cut and scored simultaneously with the cutting and scoring of its companion body blank so that both paired blanks may be recovered from a substantially rectangular section of the stock sheet in a single pass of the stock sheet through the cutting and scoring machine. Each handle forming blank B comprises two sections which are foldably connected along a transverse score which is substantially in alignment with the transverse scores 20 and 20' of the body blank.

The body blanks as shown in Figs. 2 and 12 are each designed to form a twin compartmented carrier body comprising a pair of fully formed end cells at each end of the carrier body. The paired intermediate cells of the carrier body as formed from the body blanks shown in Figs. 2 and 12 have no center divider portion to separate the intermediate cells. This center divider portion is provided by the companion handle part as applied to the carrier body.

To brace and stiffen the center divider portion of the companion handle part for the body blank as shown in Fig. 2, wing w is provided with a pair of bracing tabs 26 and 27 which extend from the end cell center partition sections 6 and 7 thereof, and wing w is provided with a matching pair of bracing tabs 26' and 27' which extend from the end wall center partitions 6' and 7' thereof. The bracing tab 26 is formed from material taken from the adjacent cross partition section 8 and is separated therefrom by cut line 28 so shaped that the bracing tab 26 stiffly projects from its associated end cell center partition section 6. The companion bracing tab 27 is formed from material taken from the adjacent cross partition section 9 and is separated therefrom by a cut line 29 so shaped that the bracing tab 27 stiffly projects from its associated end cell center partition section 7. Similarly, the bracing tab 26' in wing w' is made from material taken from the adjacent cross partition section 8' as defined by the cut line 28' so that the bracing tab 26' stiffly projects from its associated end cell center partition section 6', and the bracing tab 27' is formed from material taken from the adjacent cross partition section 9' as defined by the cut line 29' so that the bracing tab 27' stiffly projects from its associated end cell center partition section 7'. The carrier blank formed as shown in Fig. 2 will accordingly present two pairs of bracing tabs 26 and 26', 27 and 27' centrally of the erected carrier body as shown in Figs. 7 and 8 which will materially stiffen the center divider portion of the handle part to be attached to the carrier body is hereafter described.

The wings w and w' of the carrier blank as shown in Fig. 13 are provided with means for attaching and locking a handle part to the carrier body assembled therefrom. As shown in Fig. 13, the wing w is provided with a pair of bracing tabs 23 and 25 which extend from the end cell center partition sections 6 and 7, and the wing w' is provided with a matching pair of bracing tabs 23' and 25' which extend from the end cell center partition sections 6' and 7'. The bracing tabs 23 and 25 may be relatively short and are separated by cuts 22 and 24 respectively from the adjacent cross partition sections 8 and 9 so that the bracing tabs 23 and 25 will stiffly project from their associated end cell partition sections 6 and 7. Likewise, the matching bracing tabs 23' and 25' formed in the wing w' are separated by cuts 22' and 24' respectively from the adjacent cross partition section 8' and 9' so that they will stiffly project from their associated end cell center partition sections 6' and 7'.

When the body blank as shown in Fig. 13 is assembled into an erected carrier body, the cuts 22 and 24 in wing w provide a pair of spaced vertically extending slots directly adjacent the center partition sections 6 and 7 through which locking tabs associated with one section of the companion handle part may be inserted to lock that handle section to the carrier body. Similarly, the cuts 22' and 24' in the wing w' define vertically extending slots adjacent the end cell center partition sections 6' and 7' through which locking tabs associated with the other handle section of the companion handle part may be inserted to lock that handle section to the assembled carrier body. As assembled, the carrier body will present the bracing tabs 23 and 23', 25 and 25' in adjacent paired relationship, with both pairs of bracing tabs extending inwardly between the intermediate cells as indicated in Figs. 17 and 18 to thereby brace and stiffen the center divider portion of the companion handle part.

To maintain the carrier bodies assembled from the body blanks shown in Figs. 2 and 13 in fully erected position, each of these body blanks may be provided with hook portions 21 and 21' formed in the lower edges of the paired end cell center partition sections 6 and 6' which are designed to engage in a notch 11' formed in the adjacent end of the bottom panel of the carrier body.

In assembling the body blanks as shown in Figs. 2 and 13 to provide carrier bodies in collapsed form, areas of adhesive a and a' are applied to the inside faces of the side wall liner sections 10 and 10' as shown in Figs. 2 and 13. Strips b and b' of adhesive are also applied to the inside faces of the securing flaps 5 and 5'. In the first folding operation, the wing extensions w and w' are plowed or folded over along the aligned scores 16 and 16' as shown in Figs. 3 and 14 so as to thereby place the glued inside faces of the side wall liner sections 10 and 10' in overlying relation to the inside face of the center portion of the underlying side wall panels 2 and 2'. When this first folding operation has been completed, the end cell center partition sections 6 and 6' will overlie the end panel sections 4 and 4' respectively, and the end cell center partition sections 8 and 8', the side wall liner sections 10 and 10' and the end cell center partition sections 9 and 9' will all overlie the inside faces of the side wall panels 2 and 2' respectively. Also, the end cell center partition sections 7 and 7' will then overlie the end panel sections 3 and 3', with the glued securing flaps 5 and 5' extending beyond the free side edges of the adjacent end cell center partition sections 7 and 7'. Upon completion of this first folding operation, only the side wall liner sections 10 and 10' will be adhesively secured to the underlying side wall panels 2 and 2'.

In the second folding operation, the securing flaps 5 and 5' are folded along the aligned scores 15 and 15' in overlying and glued relation to the marginal edges of the end cell center partition sections 7 and 7' as shown in Figs. 4 and 15. In the second gluing operation, adhesive c is applied to the upper face of the end cell center partition section 6', and adhesive d is applied to the upper face of the end cell center partition section 7' and the securing flap 5' previously secured thereto as shown in Figs. 4 and 15.

In the third folding operation, each blank assembled as shown in Figs. 4 and 15 is folded along the bottom collapsing score 11 so as to place the end cell center partition section 6' in overlying and glued relation to its companion end cell center partition section 6, to place cross partition section 8' in overlying but unglued relation to its companion cross partition section 8, to place side wall liner section 10' in overlying but unglued relation to its companion side wall liner section 10, to place cross partition section 9' in overlying but unglued relation to its companion cross partition section 9, and to place end cell center partition section 7' and its associated securing flap 5' in overlying and glued relation to its companion end cell center partition section 7 and its associated securing flap 5. As thus glued and folded, each carrier blank will appear as shown in Figs. 5 and 16 and will constitute a fully assembled carrier body in collapsed form. When compressive pressure is exerted on the side edges of the collapsed carrier bodies as shown in Figs. 5 and 16, they will expand in the manner shown in Figs. 6 and 17 respectively and can be erected and shaped to permit application of their companion handle parts.

When the collapsed carrier body as shown in Fig. 5 has been expanded to fully erected position as shown in Figs. 7 and 8, the bottom half sections 1 and 1' thereof will flatten out and the bottle receiving cells thereof will be substantially rectangular. The paired bracing tabs 26 and 26', 27 and 27' will also be in paired abutment as shown in Figs. 7 and 8 and will extend inwardly between the intermediate cells of the carrier body. The holds left in the cross partition sections 8 and 8', 9 and 9' occasioned by the removal of the bracing tabs 26 and 26', 27 and 27' therefrom will not materially weaken the carrier body or materially detract from the ability of the cross partition sections to adequately cushion and separate the individual bottles as placed in the carrier cells.

The companion handle forming blank B for the carrier body made from the body blank shown in Fig. 2, comprises a pair of handle sections 30 and 30' which are foldably connected at the upper ends thereof along the transverse score 31. The handle sections 30 and 30' have hand holes 32 and 32' formed therein, and edge rounding flaps 37 and 37' may be captured from material which would otherwise be removed as waste in forming the hand holes. The center divider portion of this handle part is provided by a pair of center legs 33 and 33' which are separated from the spaced end legs 34 and 35, 34' and 35' respectively by open end slots 36 and 36'. The center legs 33 and 33' have a width which substantially conforms to the spacing between the center partition sections of the erected carrier body, and have a length so that they may extend down to the flattened bottom panel of the erected carrier body.

Before applying the handle forming blank B as shown in Fig. 1 to its companion carrier body, the edge rounding portions 37 and 37' of the handle blank are first rebent towards the connecting score 31 so as to overlie the outside face of their associated handle sections 30 and 30'. A coating of adhesive e is then applied to the inside face of both handle sections 30 and 30', and the handle sections then bent along their connecting score 31 into the form shown in Fig. 9. The handle sections 30 and 30' may then be telescoped into position so as to straddle the paired end cell center partition sections 7 and 7', 6 and 6' of the erected carrier body in the manner shown in Fig. 10, with the paired end legs 35 and 35' overlying the outside faces of the paired end cell center partition sections 7 and 7' and the other pair of side legs 34 and 34' overlying the outside faces of the paired end cell center partition sections 6 and 6' respectively. The paired bracing tabs 26 and 26', 27 and 27' will then be sandwiched between the center legs 33 and 33', and the cross partition sections 9 and 9', 8 and 8' will be telescoped within the open ended slots 36 and 36' formed in the handle sections. As fully applied, the side legs 34 and 34', end legs 35 and 35' and the center legs 33 and 33' should preferably extend substantially down to the flattened bottom panel of the fully erected carrier body.

The handle part as shown in Fig. 1 may be automatically applied to the carrier body by mechanical means, and may be applied while the carrier body is fully erected or partly erected. When the handle part has been fully telescoped into final position, the carrier body may be permitted to collapse in the manner indicated in Fig. 11 into substantially flat form, whereupon rolling pressure may be applied to the collapsed carrier to insure a firm adhesive bond between the side legs 34 and 34' and the end cell center partition sections 6 and 6' sandwiched therebetween, a firm bond between the side legs 35 and 35' and the paired end cell center partition sections 7 and 7' sandwiched therebetween, and a firm adhesive bond between the paired center legs 33 and 33' with the paired tabs 26 and 26', 27 and 27' sandwiched therebetween. It will be noted that the paired center legs 33 and 33' provide a double ply center divider portion which completely separates the intermediate cells, and are rigidly braced and held in fixed position by the bracing and reinforcing tabs 26 and 26', 27 and 27'.

Carriers constructed from the prepared body and handle blanks A and B as shown in Fig. 1 provide a strong and sturdy bottle carrier which can readily be collapsed in the manner indicated in Fig. 11, and may be maintained in erect position by fitting the paired hook portions 21 and 21' thereof into the conforming notch 11' provided in the adjacent end of the flattened bottom panel.

The assembled carrier as shown in Fig. 20 made from the paired body and handle blanks shown in Fig. 12 is provided with means for mechanically locking the handle part to the carrier body without the application of glue or extraneous securing means to effect secure attachment. This handle forming blank as shown in Fig. 12 comprises a pair of handle sections 40 and 40' hingedly connected along the transverse score 41. The handle sections are provided with hand hole openings 42 and 42' designed to fall into registry when the handle part is applied to the carrier body. Edge rounding flaps 43 and 43' may be recovered from the hand holes to strengthen the hand grip and provide a hand grip which is comfortable to the hand. The handle sections 40 and 40' are provided with center legs or tongues 44 and 44' hingedly connected at the upper ends thereof along transverse scores 50 and 50'. The handle sections 40 and 40' are also provided with paired side legs or tongues 45 and 45' which are separated from the intermediate center tongues 44 and 44' by cuts 46 and 46' respectively. The cuts 46 and 46' are so formed that the side tongues 45 and 45' present inwardly projecting locking tabs 47 and 47' designed to project into the receiving slot formed in the wing extensions w and w' of the assembled carrier body. The cuts 46 and 46' are also contoured to provide flared shoulders 48 and 48' at the upper end of the hinging center tongues 44 and 44' and to present laterally flared shoulders 49 and 49' at the foot end of the hinged center tongues 44 and 44'. The flared shoulders 48 and 48' at the head end of the center tongues 44 and 44' and the laterally flared shoulders 49 and 49' at the bottom end of the center tongues 44 and 44' are designed to brace against the adjacent cross partition sections of the assembled carrier body to thereby maintain the cross partition sections properly spaced for the snug reception of bottles in all of the carrier cells. The center tongues 44 and 44' preferably have a length sufficient to permit the lower end thereof to be substantially in contact with the flattened bottom panel of the erected carrier body so as to provide a full length center divider portion for the intermediate cells.

In applying the handle forming blank cut and formed as shown in Fig. 12 to its companion carrier body, the handle sections 40 and 40' are bent along their connecting score 41 into the form shown in Fig. 19. The assembled carrier body is shaped into the form shown in Fig. 18, with the center partition sections 8 and 9, 8' and 9' converging towards the center of the carrier body. When the carrier is thus shaped, the handle part formed as shown in Fig. 19 is applied so that the paired side legs 45 and 45' telescope downwardly over the paired end cell center partition sections 7 and 7', 6 and 6' with the converging ends of the cross partition sections 8 and 9 extending between the lock tabs 47 of the spaced side legs 45, and with the converging ends of the cross partition sections 8' and 9' extending between the lock tabs 47' associated with the spaced side legs 45'. This telescoping operation can be easily accomplished by first flaring the center legs or tongues 44 and 44' outwardly along their hinging scores 50 and 50'.

By exerting an outward pull on the inwardly converging end panel sections 3 and 3', 4 and 4' of the carrier body as shown in Fig. 18, the cross partition sections 8 and 9, 8' and 9' will be returned to fully expanded position and will extend at right angles to the side panels 2 and 2'. By this simple operation, the lock tabs 47 associated with the spaced legs 45 will be automatically projected through the cut slots 22 and 24 in the wing extension w, and the lock tabs 47' associated with the spaced side legs 45' will be automatically projected through the cut slots 22' and 24' in the wing extension w' of the carrier body as indicated in Fig. 21. The spaced side leg 45 of the handle section 40 will then be locked to the adjacent cross partition sections 8 and 9 and the spaced side leg 45' of the handle section 40' will be correspondingly locked to the adjacent cross partition sections 8' and 9'.

The center tongues 44 and 44' may then be swung downwardly into the intermediate cells of the fully expanded carrier body and brought substantially into abutment one with the other so as to provide a double ply center divider portion for the intermediate cells. The spaced shoulders 48 and 49 of the center tongue 44 will brace against the upper and lower portions of the cross partition sections 8 and 9 and thereafter maintain these cross partition sections in rigid spaced relationship. Similarly, the laterally extending shoulders 48' and 49' associated with the center tongue 44' will also brace against the upper and lower portions of the cross partition sections 8' and 9' so as to maintain these cross partition sections in fixed spaced relationship.

As thus applied, this handle part thereafter forms a permanent part of the completed carrier, is rigidly locked to the carrier body, and can only be removed with considerable difficulty. The center tongues 44 and 44' are further braced and stiffened by the paired bracing tabs 23 and 23', 25 and 25' sandwiched therebetween. As thus assembled, the paired center tongues 44 and 44' provide a stiff and unyielding plural-ply center divider portion for the intermediate cells, insuring adequate cushioning protection for the bottles placed therein. The bottle carrier as thus assembled and shown in Fig. 20 may be readily collapsed in the manner indicated in Fig. 22 into flat form for shipment and storage. To erect this carrier, the bottom collapsing score 11 is pressed against a flat surface and the paired hook portions 21 and 21' associated with the paired center partition sections 6 and 6' of the carrier body may then be readily engaged in the notch 11' formed in the adjacent end of the flattened bottom panel to thereby maintain the carrier in rigid erect position.

Bottle carriers formed and constructed in accordance with this invention are sturdy and lasting in use, attractive in appearance, provide complete cushioned protection for the bottles nested in the cells thereof, and may be easily and conveniently collapsed and erected. These carriers are economical in the use of paperboard or fiberboard, and the paired body and handle blanks may be cut and scored simultaneously in a single pass through a cutting and scoring machine operating at high speed. These body blanks require a minimum number of gluing and folding operations to effect collapsed assembly thereof, and high assembly speeds can be attained since only strip gluing operations and easily excuted folding operations are required. The companion handle forming blanks may be secured to the carrier body by adhesive, or by cooperating lock tabs and slots as desired. Application of the handle part to the assembled carrier body can be readily performed automatically by mechanical means operating at high assembly speeds.

While certain novel features of this invention have been disclosed herein and are pointed out in the claims, it will be understood that various omissions, substitutions, and changes may be made by those skilled in the art without departing from the spirit of this invention.

What is claimed is:

1. A six cell bottle carrier having a bottle receiving body part and a handle part formed from paperboard material, said body part having a bottom panel, a pair of side panels foldably connected to the opposite side edges of the bottom panel, a pair of end panel sections at each end of said body foldably connected to the adjacent side edges of the side panels, a pair of inwardly extending center partition sections arranged in back to back relationship and foldably connected to each pair of end panel sections, and a cross partition section foldably connected to each center partition section and secured to the adjacent side panel thereby defining two pairs of enclosed end cells in the body part, and a bracing tab formed from material removed from each of said cross partition sections and extending integrally from and in alignment with the associated center partition section and projecting into the area between the intermediate cells of the carrier, said handle part being secured to said body part and presenting a pair of foldably connected handle sections having aligned hand holes therein, each of said handle sections having a pair of vertically extending slots formed therein defining a center leg and spaced side legs, each center leg extending between the adjacent cross partition sections for substantially the full height thereof and presenting edge portions in bracing relation to upper and lower portions of the adjacent cross partition sections to thereby maintain the adjacent cross partition sections in uniform cell-defining relation, said side legs overlapping the adjacent center partition sections with adjacent side legs of said paired handle sections receiving the adjacent center partition sections therebetween, said center legs together providing a plural-ply center divider which separates the intermediate cells for substantially the full height and width thereof, said brace tabs extending between said center legs to thereby stiffen the same.

2. A bottle carrier having a bottle receiving body part and a handle part both formed from paperboard material, said body part having a bottom panel formed by a pair of foldably connected bottom sections, a pair of side panels foldably connected to the opposite side edges of the bottom panel, a pair of end panel sections at each end of the body foldably connected to the adjacent side edges of the side panels, a pair of inwardly extending center partition sections arranged in back to back relationship and foldably connected to each pair of end panel sections, a cross partition section integrally connected to each center partition section and secured to the adjacent side panel, and a bracing tab removed from each of said cross partition sections and extending integrally from and in alignment with its associated center partition section, said handle part comprising a pair of foldably connected handle sections having aligned hand holes therein, each of said handle sections having a pair of vertically extending slots formed therein defining a center leg and spaced side legs each center leg extending between the adjacent cross partition sections for substantially the full height thereof, said center leg presenting edge portions in bracing relation to the upper and lower portions of the adjacent cross partition sections to thereby maintain the adjacent cross partition sections in uniform cell-defining relation, said side legs overlapping and adhesively secured to the adjacent center partition sections, said bracing tabs extending between the center legs of the paired handle sections and adhesively secured thereto, said center legs together providing a plural-ply center divider which separates the intermediate cells for substantially the full width and height thereof, said center legs being stiffened and reinforced by said bracing tabs sandwiched therebetween.

References Cited in the file of this patent

UNITED STATES PATENTS

| | | |
|---|---|---|
| 1,157,712 | Miller | Oct. 26, 1915 |
| 2,216,299 | Schilling | Oct. 1, 1940 |
| 2,418,350 | Holy | Apr. 1, 1947 |
| 2,508,943 | Hall et al. | May 23, 1950 |
| 2,532,446 | Hall | Dec. 5, 1950 |
| 2,539,304 | Hall et al. | Jan. 23, 1951 |
| 2,598,920 | Keith | June 3, 1952 |
| 2,652,968 | Bolding | Sept. 22, 1953 |